US007778378B2

(12) United States Patent
Pülmanns et al.

(10) Patent No.: US 7,778,378 B2
(45) Date of Patent: Aug. 17, 2010

(54) LEAK DETECTION METHOD FOR TESTING FUEL RODS OF FUEL ASSEMBLIES OF A BOILING WATER REACTOR FOR LEAKS

(75) Inventors: Markus Pülmanns, Bubenreuth (DE); Richard Stark, Effeltrich (DE)

(73) Assignee: Areva NP GmbH, Erlangen (DE)

( * ) Notice: Subject to any disclaimer, the term of this patent is extended or adjusted under 35 U.S.C. 154(b) by 0 days.

(21) Appl. No.: 11/801,939

(22) Filed: May 11, 2007

(65) Prior Publication Data

US 2008/0130818 A1    Jun. 5, 2008

Related U.S. Application Data

(63) Continuation of application No. PCT/EP2005/011499, filed on Oct. 27, 2005.

(30) Foreign Application Priority Data

Nov. 11, 2004    (DE)    ........................ 10 2004 054 461

(51) Int. Cl.
*G21C 17/00* (2006.01)
(52) U.S. Cl. .................... 376/253; 376/250; 376/251
(58) Field of Classification Search ........................ None
See application file for complete search history.

(56) References Cited

U.S. PATENT DOCUMENTS 4,248,666 A    2/1981    Olsson 4,416,847 A    11/1983    Saito et al.
6,570,949 B2 *    5/2003    Knecht et al. ............... 376/253
2002/0075984 A1    6/2002    Knecht et al.

FOREIGN PATENT DOCUMENTS

JP    2003500679 T    1/2003
WO    WO 00/74071 A1    12/2000

* cited by examiner

*Primary Examiner*—Rick Palabrica
*Assistant Examiner*—Erin M Boyd
(74) *Attorney, Agent, or Firm*—Laurence A. Greenberg; Werner H. Stemer; Ralph E. Locher

(57) ABSTRACT

Fuel rods of fuel assemblies of a boiling water reactor are tested for leaks. A plurality of fuel assemblies are each arranged adjacent to one another in a cell of the upper core grid of the boiling water reactor. A hood is placed above a plurality of cells A water sample is taken from each of the cells, and the water samples from a plurality of cells forming a group are combined and tested for the presence of radioactive fission products A plurality of groups are analyzed simultaneously in a number, which number corresponds to the number of groups, of measurement channels. Where a result of a group is positive, the cells of the group are tested separately by the measurement channels. Those fuel assemblies of a cell that is found positive are tested individually outside the hood.

5 Claims, 4 Drawing Sheets

LEAK DETECTION METHOD FOR TESTING FUEL RODS OF FUEL ASSEMBLIES OF A BOILING WATER REACTOR FOR LEAKS

CROSS-REFERENCE TO RELATED APPLICATIONS

This is a continuation, under 35 U.S.C. §120, of copending international application PCT/EP2005/011499, filed Oct. 27, 2005, which designated the United States; this application also claims the priority, under 35 U.S.C. §119, of German patent application DE 10 2004 054 461.1, filed Nov. 11, 2004; the prior applications are herewith incorporated by reference in their entirety.

BACKGROUND OF THE INVENTION

Field of the Invention

The invention relates to a method for testing whether the fuel rods of fuel assemblies of a boiling water reactor leak.

In a boiling water reactor, the fuel rods of the fuel assemblies need to be tested regularly for leaks, so that defective fuel rods can be replaced in time and radioactive contamination of the cooling water is avoided. The aim in this case is to test all the fuel assemblies of the core within the shortest possible time during routine maintenance work in order to avoid unnecessary downtimes. A commonly used technique for finding leaking fuel assemblies is the so-called sipping method, which is based on the concept of detecting any existing leak by taking a liquid sample (wet sipping) or a gaseous sample (dry sipping) from the area surrounding the fuel rod and testing it for the presence of radioactive fission products. In order to increase the detection sensitivity, suitable measures are used to expel the radioactive fission products located inside the irradiated fuel rods through any leaks which may be present in the fuel rod cladding tubes with the result that, if a leak is present, they can accumulate outside the fuel rod and can be more easily detected in the sample which was taken.

A particularly suitable technique is the so-called hood sipping, as is known for example from the commonly assigned international PCT publication WO 00/74071, and its counterpart U.S. Pat. No. 6,570,949 B2.

There, a plurality of fuel assemblies, for example 16 fuel assemblies, are covered by a hood and a gas cushion is produced above these fuel assemblies. The exchange of cooling water is stopped because of said gas cushion which is located under the hood. The fuel assemblies heat up on account of their afterheat and radioactive fission products are increasingly expelled from any defective fuel rods which may be present. Some of these fission products are substances which are dissolved in water and gaseous under standard conditions, in particular Kr-85 and Xe-133. In order to detect these fission products, water samples are continuously taken (wet sipping) and continuously degassed. The gas which is produced during degassing is analyzed continuously using a radiation detector during the taking of the samples.

In the known method, the time necessary to examine the entire core is now shortened by, in a first step, combining the water samples from the four fuel assemblies which are located in one cell of the core grid, and feeding them to a respective analyzing device which includes a degassing apparatus and a detector arrangement. In other words, four analysis devices can be used to simultaneously test 4×4 fuel assemblies. If a result is positive in one of these cells, the analysis devices are now switched over, and the four water samples from the four fuel assemblies of this cell are fed separately to the analysis devices, in order that one or more defective fuel assemblies of this cell is clearly identified in this manner. Since generally only a few fuel assemblies actually have a defect, this known sipping strategy provides a test time which is clearly reduced with respect to other conventional sipping techniques.

In the known method, however, it is an essential prerequisite for clearly identifying a defective fuel assembly that the water level is sufficiently reduced by means of the gas cushion produced in the sipping hood for an exchange of cooling water between the fuel assemblies of such a cell in the intake region to be virtually ruled out, since in this case sound fuel assemblies arranged in the same cell next to a defective fuel assembly could be found positive. In other words, the water level must be sufficiently lowered in such a cell for the top edges of the fuel assembly channels which surround the respective fuel rods to lie above the water level.

The top edges of the fuel assembly channels can, however, project beyond the top edge of the upper core grid by different amounts or even lie below this top edge firstly because of design differences between the fuel assemblies of different manufacturers and secondly because of plant-specific different installation conditions. In the known method it is therefore necessary for the water level in every cell to be adjusted to the respective prevailing installation conditions in order to avoid an exchange of cooling water between neighboring fuel assemblies. This requires an additional inspection effort before the samples are taken, which is associated with an increased time requirement. Moreover, it is possible for installation conditions to be such that a simultaneous and isolated sampling from all the fuel assemblies in a core cell is not possible in any event.

BRIEF SUMMARY OF THE INVENTION

It is accordingly an object of the invention to provide a method for testing whether or not the fuel rods of fuel assemblies of a boiling water reactor are subject to leakage which overcomes the above-mentioned disadvantages of the heretofore-known devices and methods of this general type and which provides for a short test time.

With the foregoing and other objects in view there is provided, in accordance with the invention, a leak detection method for testing fuel rods of fuel assemblies of a boiling water reactor for leaks, wherein a plurality of fuel assemblies are arranged adjacent one another in a cell of an upper core grid of the boiling water reactor. The method comprises the following steps:
  a) placing a hood above the fuel assemblies of a plurality of cells forming a division for simultaneously heating the fuel assemblies of the division;
  b) taking at least one water sample from each cell of the division;
  c) combining the water samples from a plurality of cells forming a group and testing the water samples for the presence of radioactive fission products contained therein;
  d) simultaneously, and independently of one another, analyzing a plurality of groups in an equal number of groups of measurement channels of an analysis device;
  e) on registering a positive result in a given group, separately feeding the water samples from the cells located in the given group to the analysis device and analyzing the water samples separately in a corresponding number of measurement channels; and
  f) individually testing fuel assemblies of a cell that have been analyzed as positive outside the hood.

In other words, the objects of the invention are achieved with the leak testing method in which the fuel assemblies of a plurality of cells forming a division are heated simultaneously by placing a hood above this division. At least one water sample is taken from each cell of this division and the water samples from a plurality of cells forming a group are combined and tested for the presence of radioactive fission products contained in the water sample, with a plurality of groups being analyzed simultaneously and independently of one another in a number (which corresponds to said plurality of groups) of measurement channels of an analysis device. If a result in a group is positive, the water samples from the cells which are located in this group are fed separately to the analysis device and are analyzed separately in a corresponding number of measurement channels, and the fuel assemblies of a cell analyzed as positive are tested individually outside the hood.

The invention here proceeds from the consideration that the fuel assemblies located in a cell cannot be reliably separated from one another by producing a gas cushion under a hood on account of differing installation conditions, with the result that, when the fuel assemblies located under the hood are analyzed individually, it is difficult to interpret the analysis results and reliably identify a defective fuel assembly.

The procedure according to the invention, i.e. the use of the hood sipping method merely for the identification of a cell occupied by a defective fuel assembly, means it is possible to test n×n cells in only two steps using a small number n of measurement channels. Since generally only a small number of fuel assemblies are actually defective, only the fuel assemblies of a small number of cells need to be subjected to an individual analysis which is carried out when the fuel assembly is no longer under the hood, with the result that a high reliability is achieved when identifying defective fuel assemblies even under complicated plant-specific installation conditions, while the total test time remains short.

Preferably, the cells located under the hood are separated hydraulically from one another in the region of the hood and from the cells located outside the hood. This separation prevents the convective cooling of the fuel assemblies located under the hood on the one hand and the exchange of water between the cells located under the hood on the other hand.

The total test time is shortened in an especially efficient manner if, once one division has been analyzed, the hood is relocated onto another division and if the test of the individual fuel assemblies of a cell in the event of a cell being found positive is carried out at the same time as the test of the other division.

The samples from a cell are taken in particular using a number of intake lines, which number corresponds to the number of the fuel assemblies located in said cell, with each of the removal locations thereof being assigned to one fuel assembly. This increases the measurement sensitivity.

The fuel assemblies of a cell analyzed as positive are preferably lifted up successively from the core using a telescopic mast of a fuel assembly handling machine and water samples are taken in this lifted-up position and analyzed. A mast sipping method of this type results in a further shortening of the total test time.

Other features which are considered as characteristic for the invention are set forth in the appended claims.

Although the invention is illustrated and described herein as embodied in method for removing particulates from exhaust gases, and corresponding fiber layer and particulate filter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
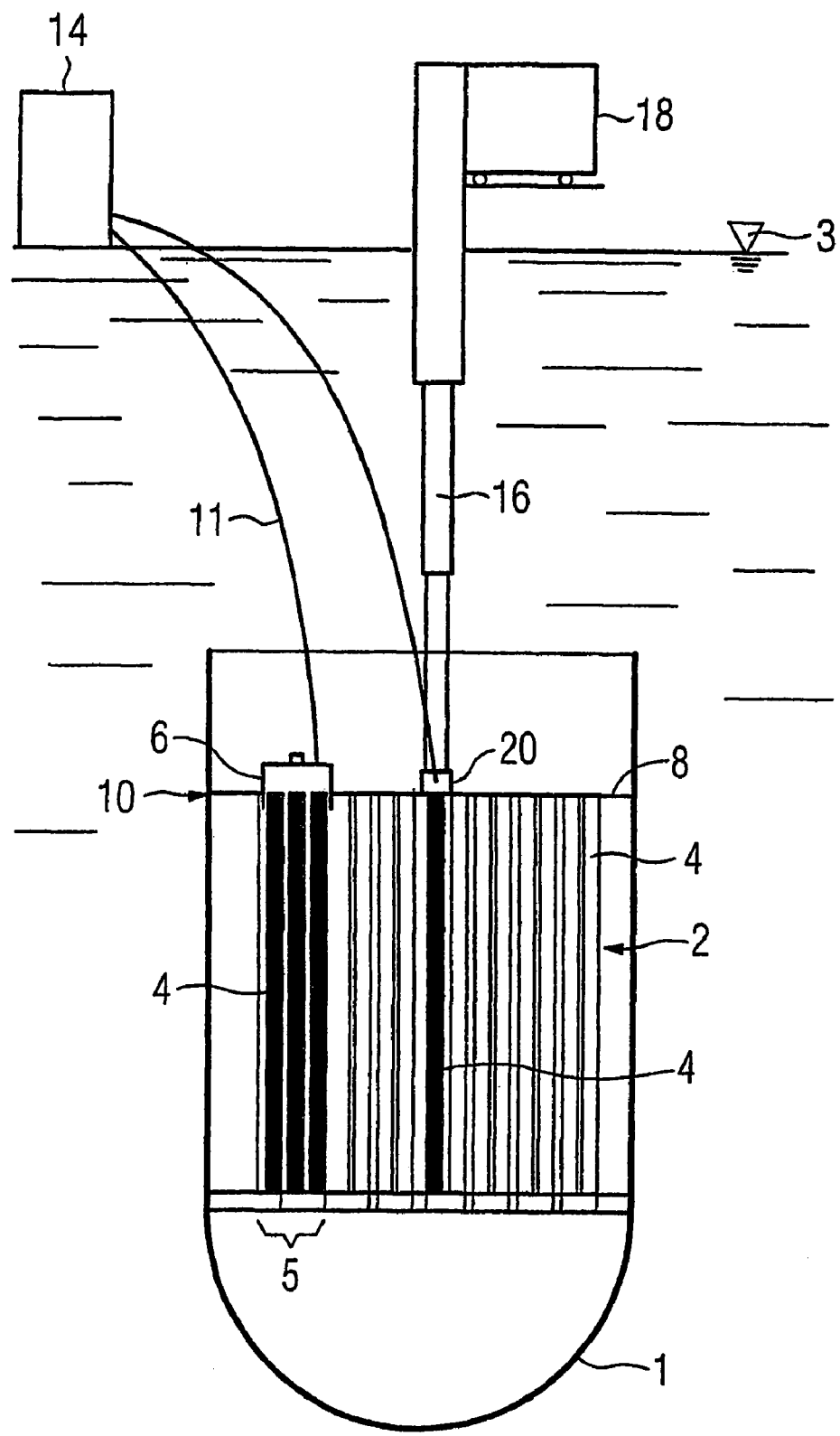
FIG. 1 depicts a schematic outline of a device while the method according to the invention is carried out.

Referring now to the figures of the drawing in detail and first, particularly, to FIG. 1 thereof, the reactor pressure vessel 1 of a boiling water reactor is open for the purposes of testing the fuel assemblies arranged in its core 2. The reactor well, wherein the reactor pressure vessel 1 is located, is flooded up to a level 3. A division 5, which comprises a plurality of cells 4 of the core 2, which are arranged adjacent to one another and each contain four fuel assemblies, is covered by a hood 6 which is seated on the upper boundary 8 of an upper core grid 10. Water samples are taken using a multichannel sampling system 11, merely indicated schematically in the figure by a removal line, and fed to a multichannel analysis device 14, wherein the water samples are tested for the presence of radioactive fission products either directly or after they have been degassed (so-called hood sipping).

In a preceding work step the hood 6 was placed over the cells 4 to be tested using the telescope mast 16 of a fuel assembly handling machine 18. Once the hood 6 is in position, it is uncoupled from the telescope mast 16 so that the latter can be moved into a different position above the core 2. The figure illustrates a situation where a sampling device 20 mounted on the free end of the telescope mast 16 is located above a cell 4 which was found positive in a preceding test using the hood 6. The fuel assemblies located in this cell 4 are successively lifted out of the core 2 using the telescope mast 16 and, in the lifted-up position, are individually, i.e. successively, tested for leaks in the analysis device 14 by taking a water sample. This method, which is referred to as mast sipping, takes advantage of the fact that fission products are increasingly expelled from any leaks which may be present on account of the pressure relief which follows the lifting operation. While the fuel assemblies are individually tested, the cells 4 located under the hood 6 are tested in the multi-channel analysis device 14. Alternatively it is also possible to relocate the fuel assemblies of the cell 4 analyzed as positive into the fuel assembly storage pool and to analyze them there in a separate measuring station.

Figure 2:
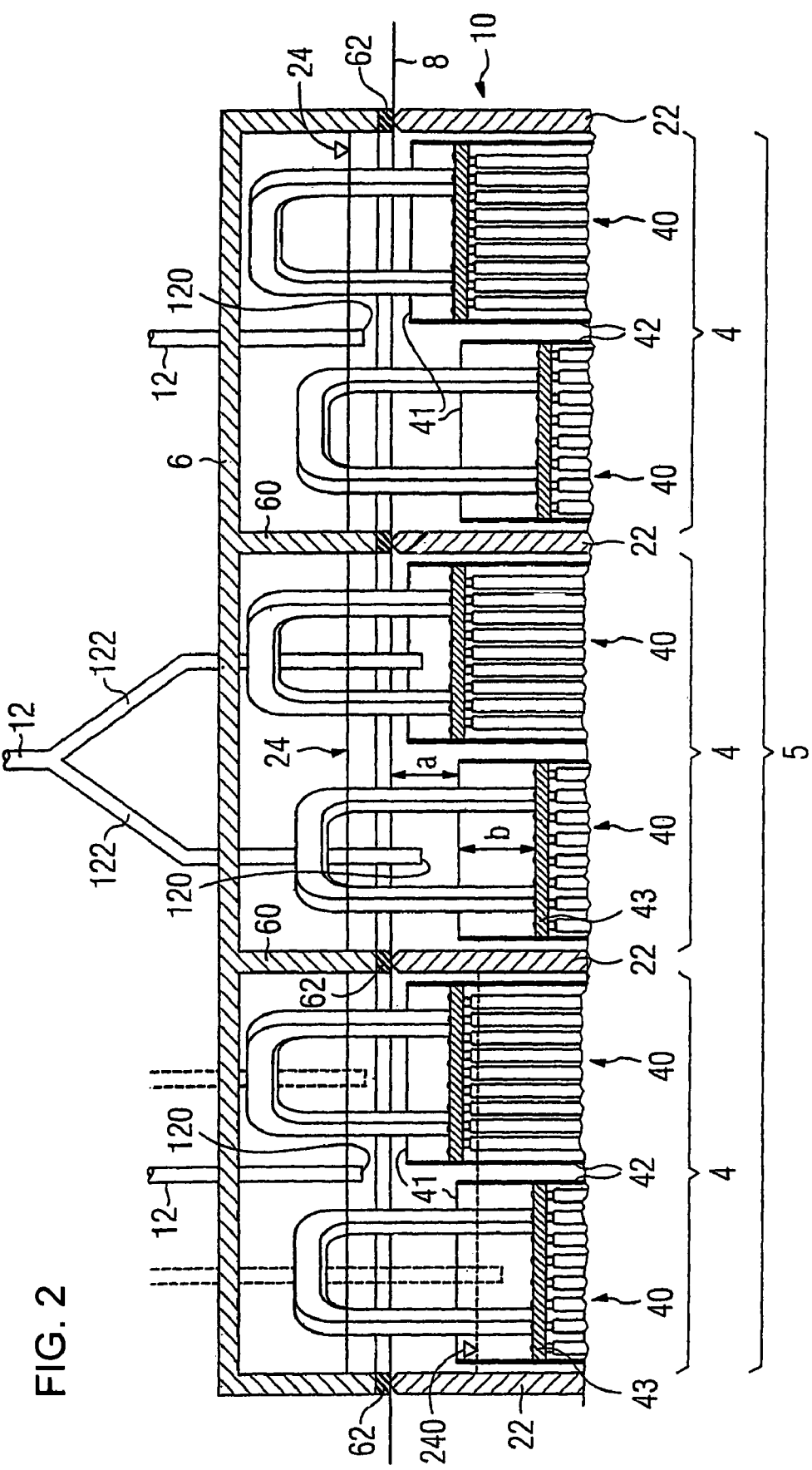
FIG. 2 depicts a hood lowered onto the fuel assemblies in the operating position during sampling in a simplified schematic illustration.

According to FIG. 2, the hood 6 covers the division 5, which contains 3×3 cells 4 in the example, of which only three can be seen in the schematic sectional illustration. Partition walls 60 arranged inside the hood 6 are used to separate the individual cells 4 located under the hood 6. Seals 62 of the hood 6 and the partition walls 60 bear on the webs 22 of the upper core grid 10. Four fuel assemblies 40 are located in each cell 4. The hood 6 separates the fuel assemblies 40 of one cell 4 located under the hood 6 from the fuel assemblies 40 of the other cells 4 located under the hood 6. Water then no longer flows through the fuel assemblies 40 located under the hood 6, with the result that the afterheat heats the now still water, which is located in the fuel assemblies, to a temperature which is about 10° C. to 15° C. higher than the water flowing outside the hood 6. Blowing in compressed gas lowers the water level 24 under the hood 6, with the result that a gas cushion is produced.

The figure illustrates an installation condition wherein the top edges 41 of the fuel assembly channels 42 of the fuel assemblies 40 are located below the upper boundary 8 of the core grid 10. Both the spacing a between the top edge 41 of a fuel assembly channel and the upper boundary 8 of the core grid 10 and also the spacing b between an upper rod-holding plate 43 and the top edge 41, depicted in the Fig. only for the left-hand fuel assembly 40, can vary from fuel assembly to fuel assembly on account of different radiation-induced increases in length such that an installation condition may occur as is depicted in the figure.

An intake line 12 of the sampling system 11 is assigned to each of the cells 4, which intake line has at least one removal location 120 which is used to take the water samples just below the water level 24 which lies at least above the highest fuel assembly channel 42. One intake line 12 with only one removal location 120 is provided for each of the left-hand and right-hand cells 4. An alternative refinement of the sampling process is illustrated in the middle cell 4, wherein four partial branches 122 branch off from the intake line 12, with each of the removal locations 120 thereof being assigned to one fuel assembly 40. The aim in this case is, as far as it is possible in technical terms on account of the respective plant-specific installation condition, to arrange the removal locations 120 inside the fuel assembly channel 42, if possible.

The installation condition illustrated in the figure, which is the same for all the cells 4 in the simplified illustration, but in reality differs from cell 4 to cell 4, now is such that, under the hood 6, a simultaneous individual measurement of the fuel assemblies 40 located in a cell 4 is not fundamentally possible using the method described in the introduction and known from the prior art. The reason is that for the purposes of an isolated sampling of water from the left-hand fuel assembly 40 in a cell 4, the water level would have to be lowered to a level 240 which is below the upper rod-holding plate 43 of the right-hand fuel assembly. With such a level 240, however, no water sample could be taken from the right-hand fuel assembly 40 because the removal location 120 cannot be guided through the rod-holding plate 43. Accordingly, samples would have to be taken at differently adjusted water levels in succession in terms of time. Furthermore, it would also be necessary for the position of the removal locations 120 to be matched in terms of height to the respective installation conditions, which differ from cell to cell, by remote control when the hood is in position, as is illustrated by the dashed lines in the left-hand cell 4. These difficulties are avoided in accordance with the invention firstly by omitting an individual analysis of the fuel assemblies 40 while they are located under the hood 6 and secondly by means of a simplified fixed arrangement of the removal locations 120 such that detection of any fission products of each fuel assembly 40 which may emerge from a fuel rod is ensured even if they cannot be assigned to a particular fuel assembly 40.

Figure 3:
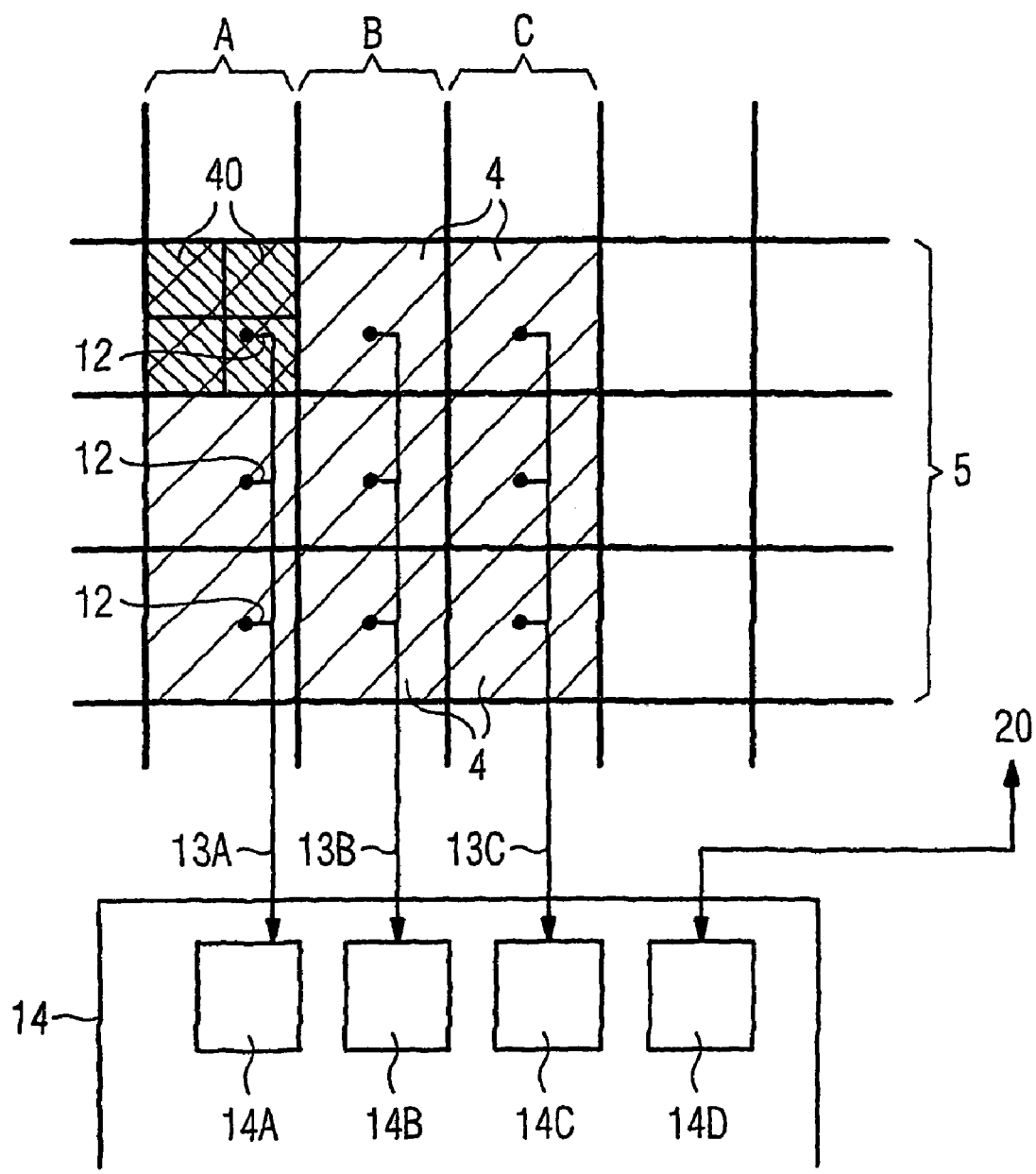
FIGS. 3 and 4 each depicts the test process according to the invention likewise in a schematic illustration.

According to FIG. 3, firstly the hood is used to cover and heat a division 5 (emphasized by hatching) of 3×3 cells 4. Three cells 4 of this division 5 are each combined to form a group A, B or C by virtue of the fact that the intake lines 12 of the cells 4 belonging to these groups A,B,C are connected to a shared collection line 13A,B,C assigned to each of these groups. The water samples taken are fed separately to measurement channels 14A, 14B and 14C of the analysis device 14 via the collection lines 13A,B,C and are analyzed there independently of one another. Another measurement channel 14D is used to analyze the water sample which was taken using the sampling device 20 which is arranged on the telescope mast.

Figure 4:
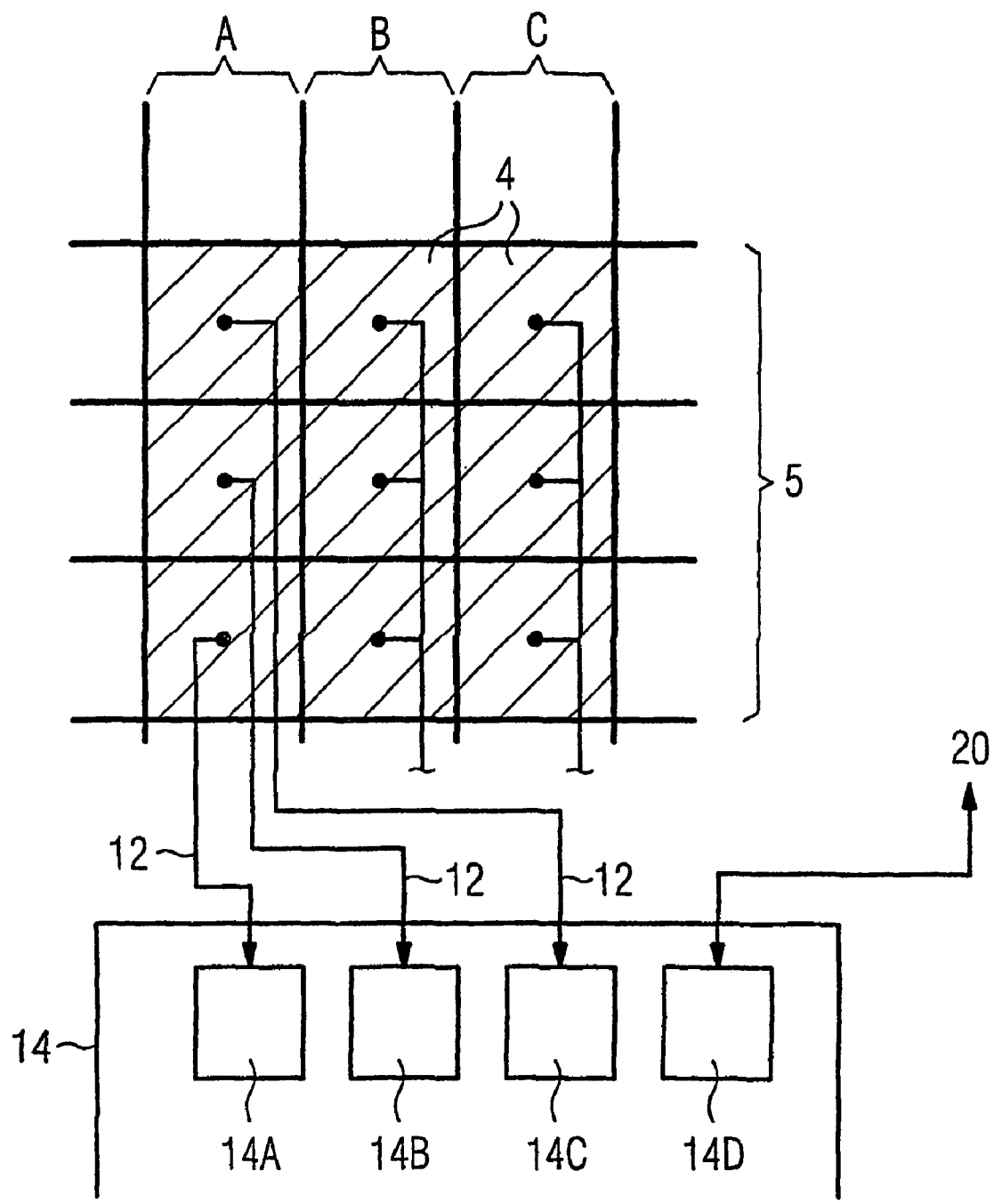

In the case of a positive result in one of the measurement channels 14A-14C, for example in measurement channel 14A, the water samples taken from the cells 4 of the group A using the intake lines 12 are fed, as is depicted in FIG. 4, separately to the measurement channels 14A-14C in order to identify in this way the cells 4 of the Group A containing a defective fuel assembly.

When the analysis of the division 5 is complete, the hood is relocated onto another division 5. The fuel assemblies 40 of the cells 4 which were previously identified as defective (found positive) are tested individually once the hood has been relocated (see FIG. 1), for example using a particularly time-saving mast sipping method, while the other division 5 is analyzed at the same time.

The invention claimed is:

1. A leak detection method for testing fuel rods of fuel assemblies of a boiling water reactor for leaks, wherein a plurality of fuel assemblies are arranged adjacent one another in a cell of an upper core grid of the boiling water reactor, the method which comprises the following method steps:

defining a division as being a plurality of cells; placing a hood above the division for simultaneously heating the fuel assemblies therein;

taking at least one water sample from each cell of the division for detecting any radioactive fission products which may emerge from any fuel rod of each fuel assembly of the division;

combining the water samples from a plurality of cells into a group and testing the water samples for the presence of radioactive fission products contained therein;

simultaneously, and independently of one another, analyzing a plurality of groups in an equal number of measurement channels of an analysis device;

on registering a positive result in a given group, separately feeding the water samples from each of the cells located in the given group to the analysis device and analyzing the water samples separately in a corresponding number of measurement channels for determining which cells have a positive result; and separating the hood from the division and individually testing fuel assemblies of positively analyzed cells outside the hood.

2. The method according to claim 1, which comprises hydraulically separating the cells located under the hood from one another in a region of the hood and from the cells located outside the hood.

3. The method according to claim 1, which comprises, once a given division has been analyzed, relocating the hood onto another division and carrying out the test of the individual fuel assemblies of a positively analyzed cell simultaneously with testing the other division.

4. The method according to claim 1, which comprises taking the samples from a cell through a number of intake lines, the number corresponding to a number of the fuel assemblies located in the cell, with each removal location thereof being assigned to one respective fuel assembly.

5. The method according to claim 1, which comprises successively lifting those fuel assemblies of a cell that have been analyzed as positive from the core using a telescope mast of a fuel assembly handling machine into a lifted-up position, and taking water samples in the lifted-up position and analyzing the water samples.

\* \* \* \* \*